United States Patent [19]

Van Etten

[11] 4,195,299
[45] Mar. 25, 1980

[54] LORAN-C SYSTEM MONITOR CIRCUIT

[75] Inventor: James P. Van Etten, Nutley, N.J.

[73] Assignee: International Telephone and Telegraph Corporation, Nutley, N.J.

[21] Appl. No.: 882,690

[22] Filed: Mar. 2, 1978

[51] Int. Cl.² ............................................. G01S 1/24
[52] U.S. Cl. ................................................. 343/103
[58] Field of Search ..................... 343/103, 180, 17.7; 325/22

[56] References Cited

U.S. PATENT DOCUMENTS

| 3,684,962 | 8/1972 | Hottel, Jr. | 343/103 |
| 3,711,856 | 1/1973 | Adrian et al. | 343/103 |
| 3,928,853 | 12/1975 | Olson | 343/180 |
| 4,106,022 | 8/1978 | Last | 343/103 |

Primary Examiner—Maynard R. Wilbur
Assistant Examiner—Richard E. Berger
Attorney, Agent, or Firm—John T. O'Halloran; Alfred C. Hill

[57] ABSTRACT

A Loran-C antenna and coupling circuit therefor are disposed at a given site, the antenna and coupling circuit therefor being capable of both transmitting and receiving. A first circuit is disposed at the given site coupled to the antenna coupling circuit to detect far-field remote signals and a second circuit is disposed at the given site coupled to the antenna coupling circuit to detect far-field local signals.

8 Claims, 1 Drawing Figure

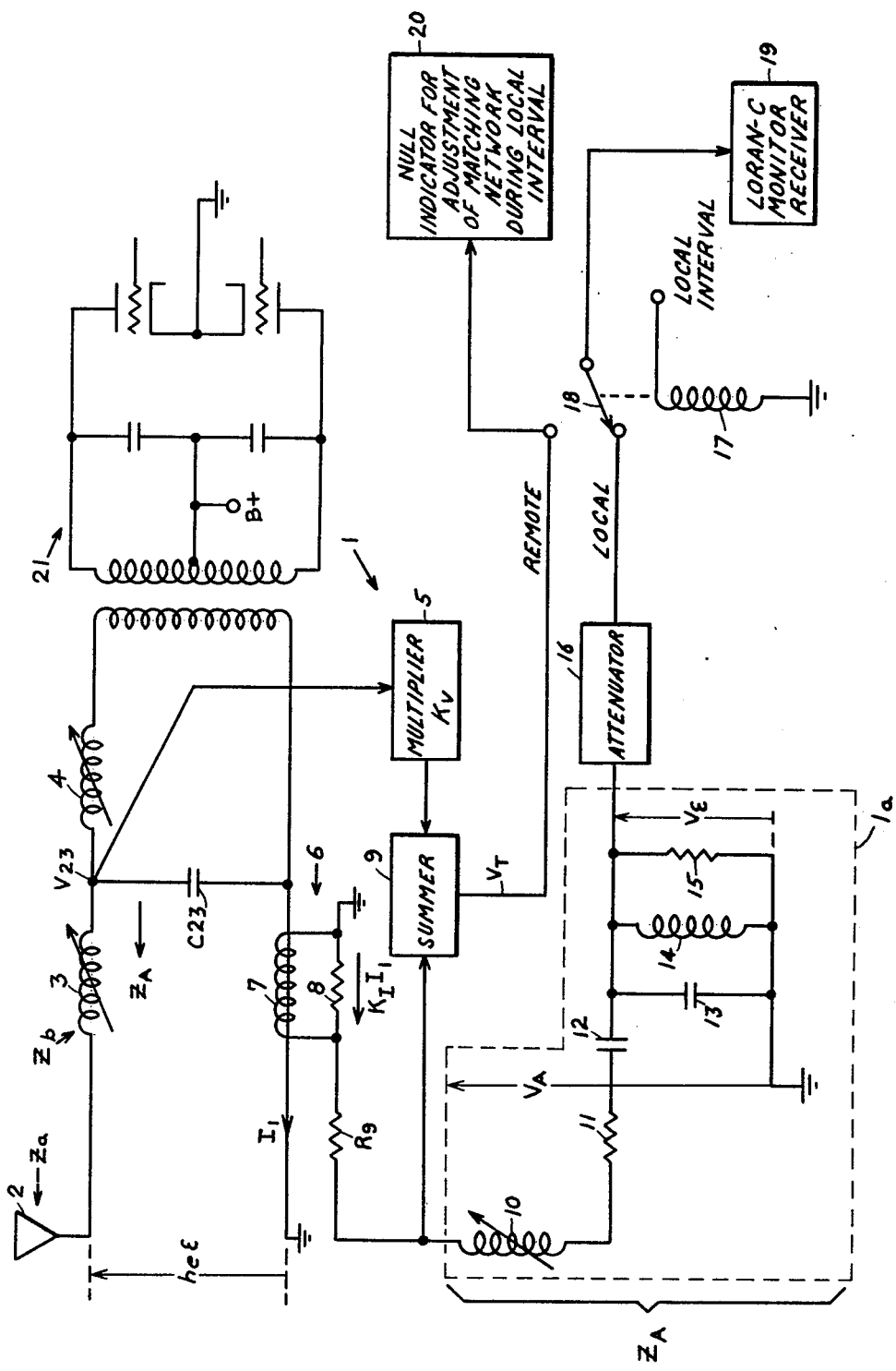

LORAN-C SYSTEM MONITOR CIRCUIT

BACKGROUND OF THE INVENTION

Loran-C is a navigation system from which hyperbolic lines of position are determined by measuring the difference in times of arrival of pulses from widely spaced, synchronized transmitting stations. All Loran-C transmitters operate at a fixed frequency of 100 KHz (kilohertz), and 99% of the radiated energy is contained within the band of 90–110 KHz. The Loran-C system achieves high accuracy of time difference measurement by phase comparison of the RF (radio frequency) carrier within the pulse transmissions. RF cycle identification is accomplished by measurement of the pulse envelope.

Loran-C transmitters achieve high stability by timing transmissions using cesium time standards. High accuracy is achieved by an initial grid calibration. This accuracy is maintained through the use of system control monitors which detect small system errors due to changes in velocity of propagation, clock drift, etc. and command small corrections to maintain full system time difference repeatability of the order of 20 nanoseconds throughout the service area.

In the prior art, the system control monitors are always at least ten miles distant from a transmitting station because measurement of time difference or time of arrival at transmitting sites has been suspect because:

(a) the local signal pickup is from the near field and the distant signal pickup is from the far field;

(b) there might be reradiation from the transmitting antenna into the receiving antenna; and (c) there is a huge signal unbalance and the probability exists of extraneous pickup affecting the phase accuracy.

SUMMARY OF THE INVENTION

An object of the present invention is to provide a technique and system application whereby the system control monitor can be disposed at the transmitting site and furthermore can employ the transmitting antenna for both transmit and receive.

A feature of the present invention is the provision of a Loran-C system monitor circuit comprising: a Loran-C antenna and coupling circuit therefor disposed at a given site, the antenna and coupling circuit therefor being capable of both transmitting and receiving; first means disposed at the given site coupled to the antenna coupling circuit to detect far-field remote signals; and second means disposed at the given site coupled to the antenna coupling circuit to detect far-field local signals.

The present invention provides undistorted far-field probe for both remote and local signals. Both signals can be combined and passed through common receiver circuits. No high level switching is required. The system application provides system control at reduced cost compared with the prior art system configurations, inasmuch as separate system control monitors would be unnecessary and could be eliminated. The system of the present invention provides improved calibration and control capability because baseline propagation variations and timing errors can be unambiguously identified.

The advantages which would accrue if both local and remote signal "far-fields" (referred to the geometric location of the transmitting antenna) could be faithfully recovered, without complex correction or calibration factors, has long been recognized. If this truly could be accomplished, measurements of time difference at each transmitter station would permit unambiguous real-time determination of each station's transmission time and the propagation time of each baseline. It would, therefore, be possible to precisely identify the reason for changes in service (for example, variation in station timing or in propagation time) and take proper corrective action. In the prior art, the cause of a variation cannot always be explicitly determined and corrections in timing are sometimes ordered to compensate for propagation variations which might better be left uncompensated, or alternatively, be broadcast to the user on a real-time basis for selection of a first-order temporal propagation correction by each user for his location.

Differential Loran has shown improvements in fix accuracies by a factor of up to three near the reference monitor. The proposal real-time monitoring and control may provide results approaching those of the differential mode and may provide these improvements throughout the service area without special monitors.

While the expected performance advantages are certainly important, the management advantages are even more significant. No area monitors are required since all monitoring is accomplished at the transmitter stations. Therefore, implementation would result in significant operational cost savings. Tighter transmission tolerances can be achieved, or alternatively, there can be greater assurance that signals are meeting prescribed tolerances.

The present application defines a concept and its implementation so that local and remote far-field signals referenced to the transmitting antenna location are recovered from voltage and current probes on the antenna coupling circuit. No high level switching is required, and the transmitter remains connected to the transmitting antenna at all times. A simple antenna interface unit accepts signal inputs from the antenna and processes them to a single output jack which serves as the signal input for the Loran-C monitor receiver. The remote and local signals are of comparable amplitude and of "far-field" Loran-C signal shape.

Prior attempts to implement the transmitting antenna as a local and remote far-field probe have been unsuccessful. However, the present invention presents a technical concept breakthrough which permits a new and comprehensive approach to the problem.

BRIEF DESCRIPTION OF THE DRAWING

Above-mentioned and other features and objects of this invention will become more apparent by reference to the following description taken in conjunction with the accompanying drawing, in which the single FIGURE is a schematic diagram partially in block form of the Loran-C system monitor circuit in accordance with the principles of the present invention.

DESCRIPTION OF THE PREFERRED EMBODIMENT

In the prior art, Loran-C signals cannot be accurately monitored at a transmitting station. The use of antenna current, or the signal picked up on a receiving antenna at the station, as a sample of the local signal does not provide a true representation of the "far-field" signal. Reception of remote signals in the vicinity of the large transmitting antenna results in both phase and amplitude distortion of the received signals degrading their use for system monitoring.

The present invention presents a technique for developing "far-field" equivalents for both local and remote signals using only the transmitting antenna, thereby providing the capability to accurately monitor Loran-C performance at the transmitter sites. Implementation of this technique can provide several significant system monitoring advantages:

(1) accurate real-time measurement and quantitative assessment of baseline electrical path lengths is provided to permit a significant increase in service area accuracy and operational potential;

(2) each station timing error and each baseline propagation variation can be unambiguously determined;

(3) the implementation provides a method of precision time transfer between master and secondary stations;

(4) no service area monitors are required for chain control;

(5) all monitor data and chain control commands can be communicated to and from the central station using a two-pulse communications system. Similarly, real-time correction factors can be broadcast to improve system accuracy; and (6) the implementation will simplify chain calibration by elimination of requirement to determine baseline electrical length by baseline extension measurements.

Summarizing these advantages, the proposed transmitting antenna "far-field" probe concept provides more accurate chain control at a substantially reduced cost.

Using the transmit antennas for accurate measurement of the far-field local and remote signals provides the capability for full chain monitoring and control based only on measurements made at the transmitter sites. Analysis of all measurements made within the chain can provide an unambiguous determination of variation in each station's timing and in each baseline propagation path. This allows independent determination of station timing equipment performance, provides a means of precision time transfer between master and secondary stations, and allows the chain commander to identify real-time variations in propagation time over baseline paths.

When using the 625-foot top-loaded monopole antenna for receiving remote Loran-C signals, the open-circuit voltage which would be developed at the base of the antenna if it were open circuited, will be used as a measure of the received radiation field.

The following describes a circuit that has been developed which, with no high level RF switching whatsoever being required, allows obtaining this open-circuit-voltage even though the antenna is fully connected to the n=3 (or n=2) output network being used for high power transmitting. That is, the antenna is not at all open circuited, but is instead fully resonated.

Referring to the Figure, there is required the use of an impedance matching netork 1a of auxiliary circuit 1 whose input impedance matches the total input impedance of the antenna 2 including its tuning coil 3. A straightforward adjustment procedure will be used, which approximately measures adjustment of the auxiliary matching circuit 1 until it satisfactorily matches the antenna plus tuning coil impedance. Therefore, it is not a matter of hoping that one has satisfactorily set the tuning coil impedance; instead, it is a solid experimental procedure for adjusting the satisfactory match.

Capacitor C23 together with the tuning coils 3 and 4 provide a portion of the coupling circuit which is n=3, between antenna 2, and the transmitter 21. The auxiliary circuit 1 includes multiplier 5, a current probe 6 including current transformer 7, resistor 8 and resistor $R_g$, a summing circuit 9, a variable inductor 10, a series connected resistor 11 together with a series connected capacitor 12, parallel connected capacitor 13, fixed inductor 14 and resistor 15 and an attenuator 16.

During the local interval relay 17 places the switch 18 in the position illustrated to connect the output of attenuator 16 to the Loran-C monitor receiver 19. When relay 17 is not energized for the local interval, switch 18 is moved to the remote terminal so that the output of summer 9 can be coupled to receiver 19. A null detector 20 is used for adjustment of the matching network to the antenna 2 and its tuning coils 3 and 4 during the local interval.

It is worthwhile to mathematically demonstrate the circuit relationships which must exist in order that $V_T$ in the FIGURE at the SUM port of summer 19 will be proportional to only the open circuit induced antenna voltage $h_e\epsilon$.

All symbols of the following Equations are shown on the FIGURE.

In the FIGURE, at the SUM port of summer 9:

$$V_T = V_A + K_v V_{23}. \tag{1}$$

In the antenna mesh of the FIGURE:

$$V_{23} = h_3\epsilon - (Z_a + Z_b)I_1. \tag{2}$$

Across the matching circuit $$V_A = \frac{Z_A}{R_g + Z_A} K_I I_1 \tag{3}$$

In the implementation of the monitor circuit of the present invention, the resistor $R_g$ will be at least twenty times greater than the impedance $Z_A$ even at the extreme ends of the frequency band of interest, (say 80 KHz and 120 KHz). Thus for all first order phenomenon, Equation (3) becomes $$V_A = (Z_A/R_g)K_I I_1. \tag{3a}$$

The approximation involved in Equation (3a) is equal to stating that the matching circuit 1a supplies only a complex-fractional-bandwidth impedance zero; whereas it actually supplies both a complex-fractional-bandwidth impedance zero and a complex-fractional-bandwidth impedance pole. With resistor $R_g$ more than twenty times greater than impedance $Z_A$ the fractional-bandwidth pole is so far away from the real frequency axis that it has negligible effect on the performance of the circuit 1a in the 80 to 120 KHz region.

Matching network impedance $Z_A$ is made equal to antenna impedance $Z_a$ plus coupling coil impedance $Z_b$ $$Z_A = Z_a + Z_b$$

Therefore Equation (2) can be written $$V_{23} = (h_3\epsilon) - (Z_A I_1) \tag{2a}$$

Substitution of Equations (2a) and (3a) in Equation (1) produces Equations (4) and (4a).

$$V_T = \frac{Z_A}{R_g} K_I I_1 + K_v(h_e\epsilon - Z_A I_1) \quad (4)$$

$$= K_v h_e \epsilon + \left(\frac{K_I}{R_g} - K_v\right) Z_A I_1 \quad (4a)$$

Equation (4a) indicates that if $K_I$ and $K_v$ are proportioned correctly, the second term in Equation (4a) can be made zero, and then $V_T$ will be a direct replica of $h_e\epsilon$ (with a gain factor of $K_v$). From Equation (4a) it is observed that for the previous statement to be true, the bracketed expression in Equation (4a) must be made to be equal to zero; that is, Equation (5) must be satisfied:

$$K_I/K_v = R_g \quad (5)$$

Hereinabove there has been described a need for, and use of, a matching network 1a whose input impedance matches the total impedance of antenna 2 plus its tuning coil 3. The very important practical point that will not just be hoped that the matching circuit is satisfactory, but that it is a solid experimental procedure which enables the adjustment of the network 1a until it does satisfactorily match the input impedance. The procedure is also used to monitor the match, so that any drifts in the actual antenna impedance will be tracked by the auxiliary network 1a.

The experimental matching and monitoring procedure will now be described. With the circuitry of the Figure unchanged, and simply used the voltage developed across capacitor C23 by the normal transmitter signal, and then as demonstrated in the following equations, if the sampling circuitry has been correctly adjusted in accordance with Equation (5), a broadband null will be produced at the SUM output of summer 9 when the input impedance of the auxiliary matching circuit satisfactorily matches the input impedance of the actual antenna and its coupling circuit.

The mathematical proof of the correctness of this nulling procedure is simple and straightforward, and is presented here for the sake of completeness.

At the SUM port of summer 9:

$$V_T = K_v V_{23} + V_A \quad (6)$$

In terms of $I_1$, the previously developed Equations (3) and (3a) still apply exactly, and substituting Equation (3a) into Equation (6), Equation (7) is obtained.

$$V_T = K_v V_{23} + \frac{Z_A}{R_g} K_I I_1 \quad (7)$$

Now, paying careful attention to the arrow directions in the Figure it is observed that:

$$I_1 = -(V_{23}/Z_A) \quad (8)$$

Substitution of Equation (8) into Equation (7) produces Equation (9):

$$V_T = \left(K_v - \frac{K_I}{R_g}\right) V_{23} \quad (9)$$

In the circuit of the Figure $K_v$ and $K_I$ have been carefully adjusted to satisfy Equation (5). Of course, this makes the bracketed expression of Equation (9) be zero, thus:

$$V_T = 0 \quad (9a)$$

If $K_v$ and $K_I$ have been correctly proportioned, a null at the SUM output of summer 9 will be obtained, each time the transmitter is driven, as long as the impedance $Z_A$ in matching network 1a and the antenna impedance $Z_a$ plus the impedance $Z_b$ of the tuning coil 3 are correctly adjusted to be identical. This nulling procedure during the transmit time will be used to guarantee the correctness of the matching network 1a and is determined by null indicator 20.

Of course, it is all important that $K_v$ and $K_I$ be previously adjusted to satisfy Equation (5) and that their correct adjustment be satisfactorily stable. It should be noted here that the null phenomenon described herein is also the basis for our exact adjustment of the $K_v$ and $K_I$ proportioning.

The procedure used to obtain a network whose transfer impedance simulates the transfer impedance between the antenna base current and resulting radiated far-field is based upon the following basic concepts.

(1) In a network made up of pure reactances plus a single internal resistance, such as the network including capacitors 12 and 13, fixed inductor 14 and resistor 15, all the power delivered to the resulting real part of the input impedance to this network must obviously be absorbed by the internal resistor 15. (In the following paragraphs the name network radiation resistance is correctly used for this real part of the input impedance which is due to the interaction of this one, single, internal resistance, and the network reactances).

(2) If the real part of the input impedance to the network truly simulates the radiation resistance of the antenna, then, because of the previously expressed power relationship, the voltage across the single internal resistor 15 will truly simulate the phenomenon in the radiated far-field from antenna 1.

(3) To simulate ground losses, copper losses, and dielectric losses, resistors must be added to the network in such a way that the total input resistance versus frequency is correctly simulated but the radiation resistance variation with frequency is not disturbed.

As shown in the Figure, switching arrangement 17 and 18 send the local transmitted signal (the voltage $V_\epsilon$ proportional to the transmitted radiated field) to the Loran-C monitor receiver 19 during the local interval and the remote received signal (the voltage $V_T$ proportional to the received open circuit radiation field) during the remote signal intervals.

As previously discussed, the value of resistor $R_g$ is so great, compared to the input impedance to the network 1 it is driving, that the network 1 is effectively being driven with a constant current which is a replica of the actual antenna current being sampled by the current transformer 7.

While I have described above the principles of my invention in connection with specific apparatus it is to be clearly understood that this description is made only by way of example and not as a limitation to the scope of my invention as set forth in the objects thereof and in the accompanying claims.

I claim:

1. A Loran-C system monitor circuit comprising:
a Loran-C antenna and coupling circuit therefore disposed at a given site, said antenna and coupling circuit therefore being employed for both transmitting and receiving Loran-C signals;

first means disposed at said given site coupled to said antenna coupling circuit to detect far-field remote signals; and second means disposed at said given site coupled to said antenna coupling circuit to detect far-field local signals.

2. A monitor circuit according to claim 1, wherein said antenna coupling circuit includes a first variable inductor, and a capacitor coupled between a terminal of said first variable inductor remote from said antenna and ground.

3. A monitor circuit according to claim 2, wherein said first means includes a multiplier coupled to said terminal of said variable inductor, a current probe coupled to said antenna coupling circuit, a first resistor having a high resistance coupled to said current probe, and a summer coupled to said multiplier and said first resistor.

4. A monitor circuit according to claim 3, wherein said second means includes a second variable inductor coupled in series with said first resistor, a second resistor coupled in series with said third variable inductor, a first capacitor coupled in series with said second resistor, a second capacitor coupled between said first capacitor and ground, a fixed inductor coupled in parallel with said second capacitor, a third resistor coupled in parallel to said fixed inductor and said second capacitor, and an attenuator coupled in series with said first capacitor.

5. A monitor circuit according to claim 1, further including a null indicator coupled to said first means to indicate during a local interval a proper impedance match between said first and second means and said antenna and coupling circuit therefore.

6. A monitor circuit according to claim 1, wherein said first means includes a voltage probe coupled to said antenna coupling circuit, a multiplier coupled to said voltage probe, a current probe coupled to said antenna coupling circuit, a first resistor having a high resistance coupled to said current probe, and a summer coupled to said multiplier and said first resistor.

7. A monitor circuit according to claim 6, wherein said second means includes a variable inductor coupled in series with said first resistor, a second resistor coupled in series with said variable inductor, a first capacitor coupled in series with said second resistor, a second capacitor coupled between said first capacitor and ground, a fixed inductor coupled in parallel with said second capacitor, a third resistor coupled in parallel to said fixed inductor and said second capacitor, and an attenuator coupled in series with said first capacitor.

8. A monitor circuit according to claim 1, wherein said second means includes a variable inductor coupled to said antenna coupling circuit, a first resistor coupled in series with said variable inductor, a first capacitor coupled in series with said first resistor, a second capacitor coupled between said first capacitor and ground, a fixed inductor coupled in parallel with said second capacitor, a second resistor coupled in parallel with said fixed inductor and said second capacitor, and an attenuator coupled in series with said first capacitor.

* * * * *